(12) United States Patent
Hoepfl et al.

(10) Patent No.: US 6,368,536 B1
(45) Date of Patent: *Apr. 9, 2002

(54) METHOD OF FORMING TOOL WITH DUAL-MATERIAL HANDLE

(75) Inventors: Joseph R. Hoepfl, Greenfield; Christopher D. Thompson, Milwaukee, both of WI (US)

(73) Assignee: Snap-on Technologies, Inc., Lincolnshire, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/539,299

(22) Filed: Mar. 30, 2000

Related U.S. Application Data

(60) Continuation-in-part of application No. 09/370,829, filed on Aug. 9, 1999, now Pat. No. 6,228,306, which is a division of application No. 08/931,086, filed on Sep. 15, 1997, now Pat. No. 5,964,009.

(51) Int. Cl.⁷ .......................... B29C 45/14; B29C 70/72
(52) U.S. Cl. ................. 264/250; 264/255; 264/274; 264/267
(58) Field of Search ................................ 264/250, 254, 264/255, 267, 273, 274, 271.1, 275

(56) References Cited

U.S. PATENT DOCUMENTS

| | | | |
|---|---|---|---|
| RE20,165 E | 10/1936 | Knapp | |
| 2,177,064 A | 10/1939 | Harsted | |
| 2,205,769 A | 6/1940 | Sweetland | |
| 2,871,899 A | 2/1959 | Coyle et al. | |
| 2,985,209 A | 5/1961 | Novelo | |
| 3,189,069 A | 6/1965 | Stowell | |
| 3,302,673 A | 2/1967 | Forsberg | |
| 4,155,972 A | 5/1979 | Hauser et al. | |
| 4,381,579 A | 5/1983 | Rumpp | |
| 4,729,271 A | 3/1988 | Kenigson | |
| 4,837,892 A | 6/1989 | Lo | |
| 4,934,024 A | 6/1990 | Sexton | |
| 4,941,232 A | 7/1990 | Decker et al. | |
| 4,951,533 A | 8/1990 | Hillinger | |
| 4,969,231 A | 11/1990 | Mader et al. | |
| 5,011,316 A | 4/1991 | Damon | |
| 5,136,900 A | 8/1992 | Chapin | |
| D329,367 S | 9/1992 | Landy | |
| 5,327,612 A | 7/1994 | Kelsay | |
| 5,355,552 A | 10/1994 | Huang | |

(List continued on next page.)

FOREIGN PATENT DOCUMENTS

| | | |
|---|---|---|
| DE | 9539200 | 4/1997 |
| DE | 9803967 | 4/1998 |
| EP | 0727289 | 8/1996 |
| FR | 2611567 | 9/1988 |
| FR | 2635998 | 3/1990 |
| GB | 2274615 | 3/1994 |

OTHER PUBLICATIONS

WO. 93/16846, Sep. 1993, Inventor: Holland–Letz 16/DIG. 12.

Primary Examiner—Angela Ortiz
(74) Attorney, Agent, or Firm—Seyfarth Shaw

(57) ABSTRACT

A driving tool, such as a screwdriver, has a handle with an injection-molded, relatively hard and rigid inner body, molded around a tool shank, the inner body having an elongated central portion with two end flanges extending laterally outwardly of the central portion around the entire periphery thereof, with the central portion having a peripheral groove formed therein adjacent to an end flange. An outer gripping body of a relatively soft and resilient material is injection molded around the inner body, by supporting the inner body by its ends in a mold cavity and injecting the mold charge adjacent to the groove so that it first fills the groove and then flows in a circumferential front longitudinally to the other end flange, surrounding said central portion of said inner body.

10 Claims, 2 Drawing Sheets

U.S. PATENT DOCUMENTS

| | | |
|---|---|---|
| 5,390,572 A | 2/1995 | Gakhar et al. |
| 5,446,941 A | 9/1995 | Kelsay |
| 5,551,323 A | 9/1996 | Beere et al. |
| 5,615,445 A | 4/1997 | Kelsay et al. |
| 5,781,963 A | 7/1998 | Maru et al. |
| 5,964,009 A * | 10/1999 | Hoepfl et al. ............. 16/111 R |
| 6,228,306 B1 * | 5/2001 | Hoepfl et al. ................ 264/254 |

* cited by examiner

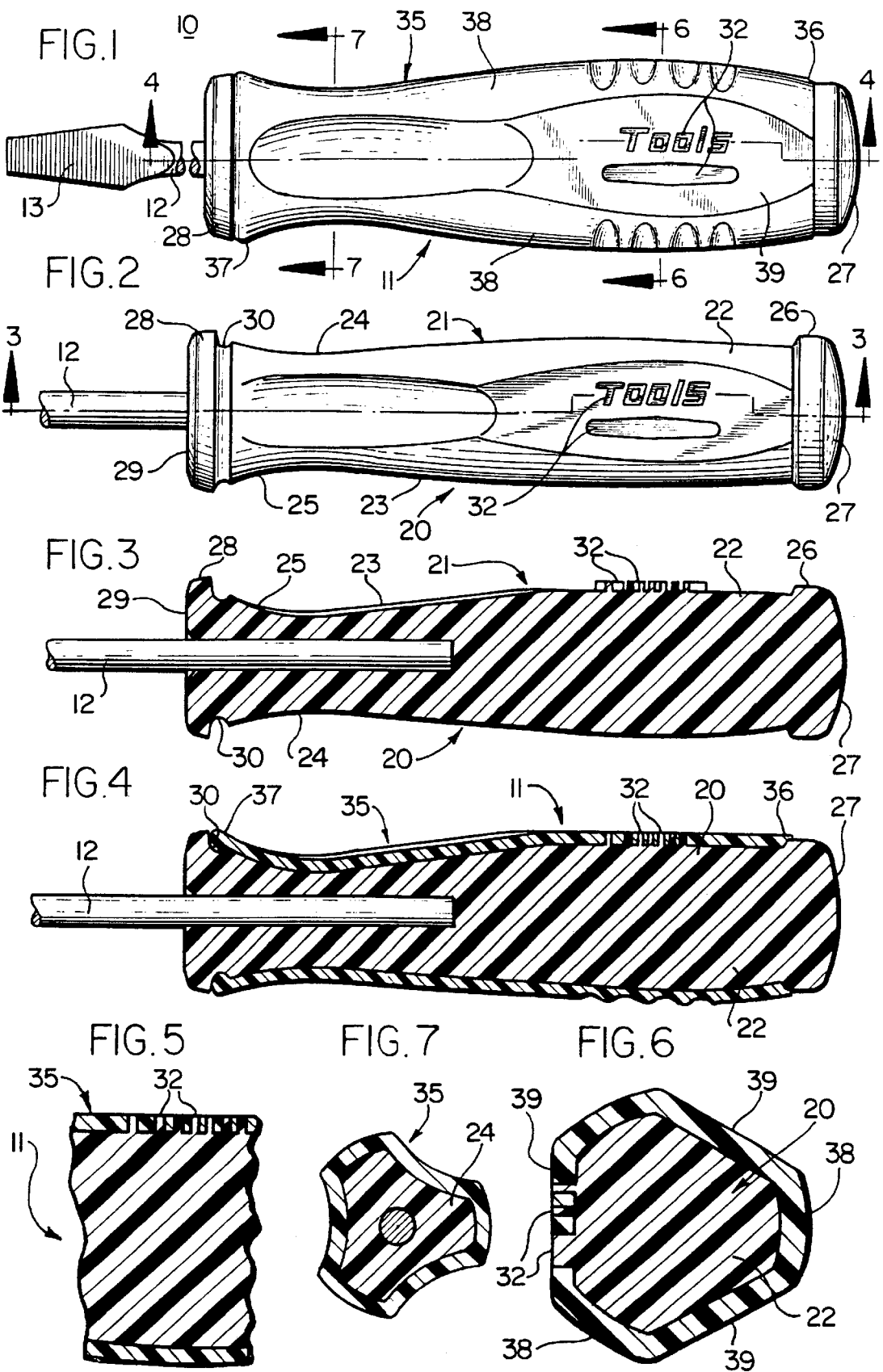

METHOD OF FORMING TOOL WITH DUAL-MATERIAL HANDLE

CROSS-REFERENCE TO RELATED APPLICATIONS

This application is a continuation-in-part of Ser. No. 09/370,829, filed Aug. 9, 1999, now U.S. Pat. No. 6,228,306 which, in turn, is a division of application Ser. No. 08/931,086, filed Sep. 15, 1997, now U.S. Pat. No. 5,964,009.

BACKGROUND

The present application relates to hand tools, particularly drivers, such as screwdrivers, nut drivers and the like. The application relates in particular to methods of making tool handles.

DESCRIPTION OF THE PRIOR ART

It is known to provide hand tools with plastic handles which are typically formed of a single plastic material molded around an end of a tool shank.

It is also known to provide tool handles with a two-part construction, including an inner portion formed of a hard or rigid material for the necessary handle strength, and an outer gripping portion formed of a softer and/or more resilient or flexible material for user comfort and to afford a n improved grip by increasing the frictional gripping force between the tool handle and the user's hand. However, heretofore such dual-material handles have either had a relatively complex and expensive construction or have suffered from slippage of the outer hand grip portion relative to the inner body portion.

Also, in molding prior dual-material handles, it has been difficult to maintain uniform depth of the outer gripping material. Typically, the inner rigid core is supported by its ends as a preform in a mold cavity and the outer resilient or flexible gripping material is injected along one side of the longitudinal extent of the handle and then flows circumferentially around the handle in both directions along substantially the entire longitudinal extent. This can introduce bending or uneven forces on the preform, which can cause uneven depth of material. Also, in the event that there are raised indicia on the preform around which the softer material is to be flowed, these bending forces can result in an improper seal between the tops of the raised indicia and the mold, causing the inflowing material to cover and obscure the indicia. Also, this technique tends to result in a cold knit line in the finished handle extending longitudinally of the preform along the side thereof opposite from the mold inlet gate.

SUMMARY

This application describes a technique for providing an improved hand tool with a handle construction which avoids the disadvantages of prior tools while affording additional structural and operating advantages.

The application describes a hand tool with a dual-material handle of simple and economical construction, with a hard core and softer outer grip portion. The handle affords improved user grip and comfort while providing superior bonding of the handle materials and prevention of slippage of the outer grip portion.

An improved method of molding the handle is also disclosed which results in balanced forces on mold preform inserts, good sealing around raised indicia on the preform and avoidance of cold knit lines on the finished handle.

In particular, there is provided a method of forming a hand tool comprising the steps of: injection molding a relatively hard and rigid inner body having an elongated central portion and two end flanges extending laterally outwardly of the central portion around the entire periphery thereof, the central portion having a peripheral groove formed therein adjacent to an end flange, and injection molding around the inner body an outer gripping body formed of a relatively soft and resilient material so as to surround the central portion of the inner body and fill the groove.

BRIEF DESCRIPTION OF THE DRAWINGS

For the purpose of facilitating an understanding of the subject matter sought to be protected, there are illustrated in the accompanying drawings preferred embodiments thereof, from an inspection of which, when considered in connection with the following description, the subject matter sought to be protected, its construction and operation, and many of its advantages should be readily understood and appreciated.

FIG. 1 is a side elevational view of a hand tool with a portion of the tool shank broken away;

FIG. 2 is a slightly enlarged, fragmentary, side elevational view of the tool of FIG. 1, with the outer gripping body removed;

FIG. 3 is a view in vertical section taken along the line 3—3 in FIG. 2;

FIG. 4 is a fragmentary view in vertical section taken along the line 4—4 in FIG. 1;

FIG. 5 is an enlarged, fragmentary, sectional view of a portion of the handle of FIG. 4;

FIG. 6 is an enlarged view in vertical section taken along the line 6—6 in FIG. 1;

FIG. 7 is an enlarged view in vertical section taken along the line 7—7 in FIG. 1;

DETAILED DESCRIPTION

Figure 8:
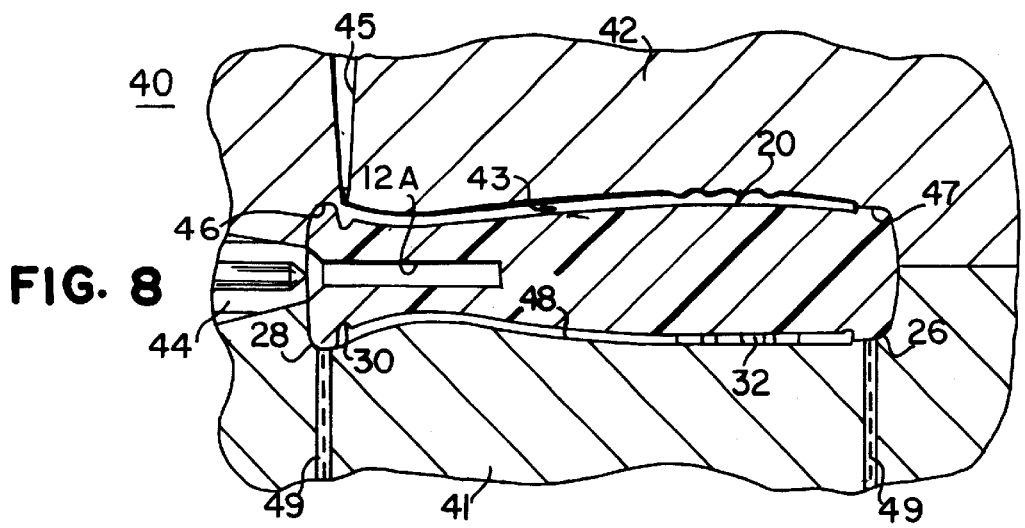
FIG. 8 is a fragmentary sectional view of a mold assembly for making the handle of the hand tool of FIGS. 1–7.

Referring to FIGS. 1 and 4–7, there is illustrated a hand tool, generally designated by the numeral 10, in the nature of a screwdriver. The tool 10 includes an elongated handle 11 and an elongated shank 12 projecting from one end of the handle 11, substantially axially thereof, and terminating in a tip 13, such as a flat blade screwdriver tip. While the tool 10 is in the form of a screwdriver, it will be appreciated that the principles of the present invention are applicable to other types of hand tools, particularly manually rotatable driver-type tools.

The handle 11 is of two-part construction, including an inner body 20 and an outer gripping body 35. Referring also to FIGS. 2 and 3, the inner body 20 is preferably injection molded around an end of the shank 12 and formed of a suitable plastic material, such as polypropylene, although other materials could be used. Preferably, the inner body 20, as molded, is a relatively hard and rigid member, including an elongated central portion 21 coaxial with the shank 12. The central portion 21 has a main rear section 22, a forwardly sloping section 23, a reduced cross-section neck section 24 and a flared section 25. The central portion 21 is unitary at its rear end with an end flange 26, which extends laterally outwardly from the central portion 21 around its entire periphery and has a curved end surface 27. The central portion 21 is unitary at its forward end with an end flange 28, which projects laterally outwardly from the central portion 21 around its entire periphery and terminates in a substantially flat end surface 29.

Formed in the outer surface of the inner body 20 at the junction between the central portion 21 and the front end flange 28 is a peripheral groove 30. If desired, a similar groove may be provided adjacent to the rear end flange 26. The inner body 20 has a transverse cross-sectional shape which varies from one end to the other. Thus, the main or rear section 22 has a transverse cross section which is generally in the shape of a triangle with rounded corners (see FIG. 6), while the cross section at the neck section 24 may have a generally tri-lobular shape (see FIG. 7). Raised indicia 32 may project laterally outwardly from the outer surface of the main rear section 22.

The outer gripping body 35 is preferably injection molded around the inner body 20 and is formed of a suitable thermoplastic elastomer material, although other materials could be used. Preferably, the material of the outer gripping body 35 is selected so that, in its as-molded condition, it is relatively soft and flexible to provide an improved gripping surface and improved comfort for a user's hand. The outer gripping body 35 completely covers the central portion 21 of the inner body 20 between the end flanges 26 and 28, except that the outer surface of the outer gripping body 35 is preferably substantially flush with the tops of the raised indicia 32, as can best be seen in FIGS. 4–6, filling all of the spaces between the indicia 32. The outer gripping body 35 also fills the groove 30 on the inner body 20 to facilitate non-slip adhesion of the outer gripping body 35 to the inner body 20. The outer gripping body 35 has end portions 36 and 37 which have a thickness such that they do not extend laterally outwardly substantially beyond the periphery of the end flanges 26 and 28. In the preferred embodiment the front end portion 37 is substantially flush with the outer surface of the front end flange 28, while the rear end portion 36 may extend laterally outwardly a slight distance beyond and slightly overlap the outer surface of the rear end flange 28, as can best be seen in FIGS. 1 and 4. It will be appreciated that the end flanges 26 and 28 cooperate with the outer gripping body 35 to inhibit longitudinal sliding movement of the outer gripping body 35 relative to the inner body 20.

Preferably, the thickness of the outer gripping body 35 is substantially constant along the length and around the periphery of the handle, but it may vary slightly. However, it will be appreciated that, by suitable design of the molding tools, the outer surface of the finished hand tool 10 may have any desired cross-sectional shape anywhere along its length.

There results a hand tool with a hard, rigid inner body 20 fixedly secured to the tool shank 12 so as to provide the necessary strength for high-torque applications, while at the same time providing a relatively soft and flexible outer gripping body 35 for contact with the user's hand to afford a comfortable frictional gripping surface The handle 11 is formed in a two-shot injection molding process, the inner body 20 being formed in the first shot and the outer gripping body 35 being formed in the second shot. The first shot is conventional and, therefore, is not described in detail herein. Referring to FIG. 8, there is illustrated a mold assembly 40 for performing the second shot. The mold assembly 40 includes a lower mold part 41 and an upper mold part 42 which cooperate to define a mold cavity 43. In operation, after the formation of the inner body 20, which, in the illustrated embodiment, as been molded with an axial bore 12A in the front end thereof, is moved as a preform into the mold cavity 43. More specifically, the inner body 20 is fitted over a fixture 44, which projects axially into the mold cavity 43 and is received into the axial bore 12A for accurately positioning and temporarily supporting the inner body 20. Then the mold assembly 40 is closed. As can be seen in FIG. 8, the mold assembly 40 has an inlet gate 45 positioned directly over the peripheral groove 30 for introducing the mold charge thereinto. It can be seen that, when the mold assembly 40 is closed, it clamps tightly around the end flanges 26 and 28 of the inner body 20 for supporting the inner body 20 at its opposite ends. Also, the mold cavity 40 is designed so that, in its closed condition, the lower part 41 seals tightly against the distal ends of the indicia 32 along a seal surface 48.

Figure 9A:
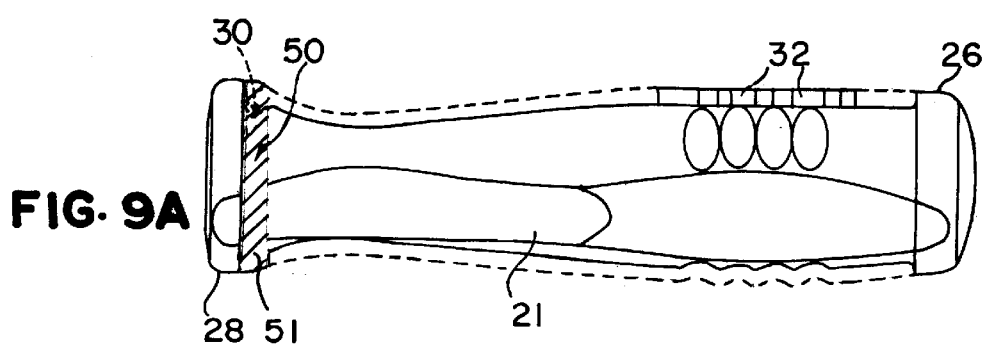
FIGS. 9A through 9C are diagrammatic illustrations of the material flow in the mold assembly of FIG. 8, with the orientation of the parts inverted from that in FIG. 8.
Figure 9B:
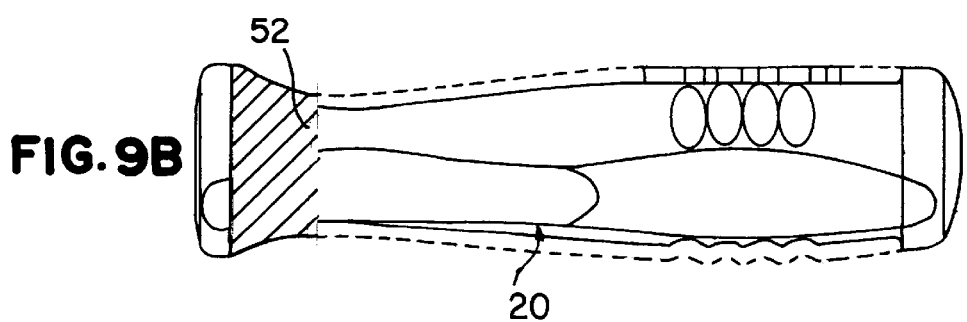
Figure 9C:
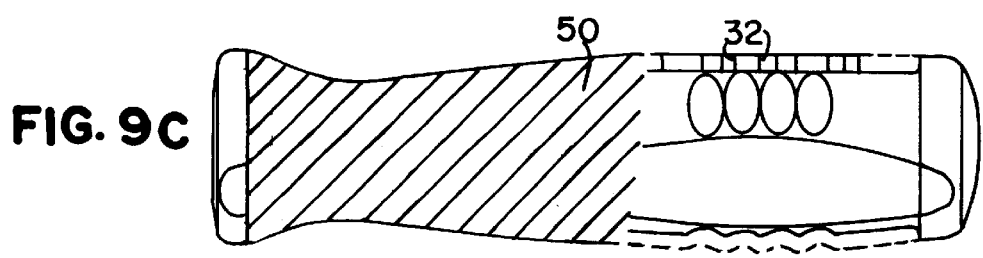

FIGS. 9A–9C diagrammatically illustrate the progression of the mold charge 50 through the mold cavity 43. As can be seen in FIG. 9A, the mold charge initially is introduced into the peripheral groove 30 and flows circumferentially therearound, forming a ring of material 51, filling the groove 30.

Then, referring to FIG. 9B, the mold charge begins to move longitudinally rearwardly along the inner body 20 around the entire length of the ring of material 51, forming an advancing front 52. This front continues to move rearwardly in the direction of the arrows in FIG. 9C, flowing around the raised indicia 32 and finally stopping against the end flange 26. Because the mold charge advances in a continuous ring of material, it exerts substantially equal pressure on the inner body 20 at all points around the periphery thereof, thereby preventing a tendency to bend or deflect the inner body 20 in the mold cavity 53. Thus, the outer gripping body 35 is formed with a desired thickness in a uniform manner and the seal between the lower mold part 41 and the raised indicia 32 is maintained. After completion of the second shot of the mold, the mold assembly 43 is opened and the completed handle 11 is removed, after which a shank 12 may be press fitted into the bore 12A or fixedly secured therein by other means, such as suitable adhesives or the like.

However, it will be appreciated that in forming the tool 10, the inner body 20 may alternatively be injection molded around an end of the shank 12 in the first mold shot, after which the outer gripping body 35 is injection molded around the inner body 20. In that case the fixture 44 would not be used and the mold assembly 40 would be slightly modified to accommodate the shank 12. Also, it will be appreciated that other techniques could be used for forming and applying the outer gripping body 35 and, if desired, it could be preformed and secured in place by the use of suitable adhesives or the like.

From the foregoing, it can be seen that there has been provided an improved hand tool and method of forming same with a handle having both high strength and a comfortable gripping surface for contact with the user's hand.

The matter set forth in the foregoing description and accompanying drawings is offered by way of illustration only and not as a limitation. While particular embodiments have been shown and described, it will be obvious to those skilled in the art that changes and modifications may be made without departing from the broader aspects of applicants' contribution. The actual scope of the protection sought is intended to be defined in the following claims when viewed in their proper perspective based on the prior art.

We claim:

1. A method of forming a hand tool comprising the steps of:

injection molding a relatively hard and rigid inner body having an elongated central portion with an outer surface at a first level and two end flanges extending laterally outwardly of the central portion around the entire periphery thereof to a second level above the first level, said central portion having a peripheral groove formed therein to a third level below the first level adjacent to an end flange, and injection molding around said inner body an outer gripping body formed of a relatively soft and resilient material so as to surround said central portion of said inner body and fill said groove.

2. The method of claim 1, wherein said inner body is generally triangular in transverse cross section.

3. The method of claim 1, wherein said outer body is molded to a thickness such that the portions thereof respectively adjacent to said end flanges are laterally approximately coextensive with said end flanges.

4. The method of claim 3, wherein said outer body is formed to a thickness such that the portion thereof adjacent to at least one of said end flanges is substantially flush therewith.

5. The method of claim 1, wherein said step of injection molding said inner body includes molding said body around a tool shank such that the shank projects from an end of said inner body substantially coaxially therewith.

6. A method of forming a hand tool comprising the steps of:

providing a relatively hard and rigid inner body having an elongated central portion and two end flanges extending laterally outwardly of the central portion around the entire periphery thereof and a peripheral groove formed in the central portion adjacent to one end flange, and injection molding around the inner body an outer gripping body by causing mold charge in fluid state to flow first along the peripheral groove and then to flow longitudinally along the central portion to another end flange, the mold charge being such that it cools to a relatively soft and resilient material in solid state filling the peripheral groove and abutting the end flanges.

7. The method of claim 6, wherein the mold charge, while flowing along the length of the central portion, exerts substantially equal pressure thereon around the entire periphery thereof.

8. A method of forming a hand tool comprising the steps of:

providing a relatively hard and rigid inner body having an elongated central portion with two ends and two end flanges extending laterally outwardly of the central portion around the entire periphery thereof and a peripheral groove formed in the central portion adjacent to one end flange, supporting the inner body only at the ends in a mold cavity, and injection molding around the inner body an outer gripping body by introducing a mold charge in fluid state into the mold cavity adjacent to the one end flange so that the charge flows first along the peripheral groove and then flows longitudinally along the central portion to another end flange, the mold charge being such that it cools to a relatively soft and resilient material in solid state filling the peripheral groove and abutting the end flanges.

9. The method of claim 8, wherein the mold charge, while flowing along the length of the central portion, exerts substantially equal pressure thereon around the entire periphery thereof.

10. The method of claim 8, wherein the inner body has raised indicia on the central portion thereof, and further comprising providing a seal against the distal ends of the indicia so that the mold charge flows around the indicia but does not cover the distal ends thereof, the mold charge, while flowing along the length of the central portion, exerting substantially equal pressure thereon around the entire periphery thereof so as not to disturb the seal against the indicia.

* * * * *